(12) United States Patent
Goldstein et al.

(10) Patent No.: US 8,195,521 B1
(45) Date of Patent: * Jun. 5, 2012

(54) METHOD OF AND SYSTEM FOR PROCESSING TRANSACTIONS

(75) Inventors: Neal L. Goldstein, Palo Alto, CA (US); Adam J. Richards, Concord, CA (US); David Sherr, Moraga, CA (US); David Levy, San Francisco, CA (US); Chalon G. Mullins, Danville, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,098

(22) Filed: Dec. 3, 2010

Related U.S. Application Data

(63) Continuation of application No. 11/481,498, filed on Jul. 6, 2006, now Pat. No. 7,870,032, which is a continuation of application No. 09/672,684, filed on Sep. 28, 2000, now Pat. No. 7,110,973.

(60) Provisional application No. 60/156,814, filed on Sep. 29, 1999.

(51) Int. Cl.
*G06Q 30/00* (2012.01)
*G06Q 40/00* (2012.01)

(52) U.S. Cl. .................. 705/26.1; 705/27.1; 705/37

(58) Field of Classification Search .................. 705/26.1, 705/27.1, 37; 707/610, 648, 649, 650, 651, 707/652, 653
See application file for complete search history.

(56) References Cited

U.S. PATENT DOCUMENTS

| | | | | |
|---|---|---|---|---|
| 4,799,156 A | * | 1/1989 | Shavit et al. | 705/26.3 |
| 4,980,826 A | * | 12/1990 | Wagner | 705/37 |
| 5,101,353 A | * | 3/1992 | Lupien et al. | 705/37 |
| 5,270,922 A | * | 12/1993 | Higgins | 705/37 |
| 5,375,055 A | * | 12/1994 | Togher et al. | 705/37 |
| 5,864,827 A | * | 1/1999 | Wilson | 705/35 |
| 5,870,717 A | * | 2/1999 | Wiecha | 705/26.81 |
| 5,880,446 A | * | 3/1999 | Mori et al. | 235/380 |
| 5,946,667 A | * | 8/1999 | Tull et al. | 705/36 R |
| 6,021,470 A | * | 2/2000 | Frank et al. | 711/138 |
| 6,253,211 B1 | * | 6/2001 | Gillies et al. | 707/610 |
| 6,269,343 B1 | * | 7/2001 | Pallakoff | 705/26.2 |
| 6,324,587 B1 | * | 11/2001 | Trenbeath et al. | 719/310 |
| 6,411,991 B1 | * | 6/2002 | Helmer et al. | 709/217 |

(Continued)

FOREIGN PATENT DOCUMENTS
WO    WO-0102927 A2 * 1/2001
(Continued)

OTHER PUBLICATIONS

Fulcher, J., "The Evolution Continues," Manufacturing Systems, vol. 14, No. 8, pp. 74-85, Aug. 1996.*

(Continued)

*Primary Examiner* — Nicholas D Rosen
(74) *Attorney, Agent, or Firm* — Kilpatrick Townsend & Stockton LLP

(57) ABSTRACT

A method of and system for conducting electronic commerce segments an enterprise is segmented into a single firm side system, and multiple customer facing and street side systems. The firm side system maintains a single system of record for the enterprise. The customer facing systems provide an interface between the enterprise and the customer. The street side systems are in communication with the customer facing systems. The street side systems provide an interface between the enterprise and various markets.

23 Claims, 3 Drawing Sheets

U.S. PATENT DOCUMENTS

| | | | |
|---|---|---|---|
| 6,446,048 B1 * | 9/2002 | Wells et al. | 705/35 |
| 6,457,021 B1 * | 9/2002 | Berkowitz et al. | 1/1 |
| 6,505,175 B1 * | 1/2003 | Silverman et al. | 705/36 R |
| 6,618,764 B1 * | 9/2003 | Shteyn | 709/249 |
| 6,643,661 B2 * | 11/2003 | Polizzi et al. | 707/709 |
| 7,110,973 B1 * | 9/2006 | Goldstein et al. | 705/37 |
| 7,174,363 B1 * | 2/2007 | Goldstein et al. | 709/203 |
| 7,870,032 B2 * | 1/2011 | Goldstein et al. | 705/26.1 |
| 2002/0049843 A1 * | 4/2002 | Barone et al. | 709/225 |
| 2002/0173984 A1 * | 11/2002 | Robertson et al. | 705/1 |
| 2003/0023540 A2 * | 1/2003 | Johnson et al. | 705/37 |
| 2003/0152182 A1 * | 8/2003 | Pai et al. | 375/372 |

FOREIGN PATENT DOCUMENTS

WO  WO-0111453 A2 * 2/2001

OTHER PUBLICATIONS

Epstein, C., "Keeping One Eye on the Future, CME Launches Globex2," Wall Street & Technology, vol. 16, No. 11, p. 40, Nov. 1998.*

Warner, P.D., "ACL for Windows," CPA Journal, vol. 68, No. 11, pp. 40-44, Nov. 1998.*

* cited by examiner

METHOD OF AND SYSTEM FOR PROCESSING TRANSACTIONS

CROSS-REFERENCE TO RELATED APPLICATION

The present application is a continuation of and claims priority from U.S. patent application Ser. No. 11/481,498, filed Jul. 6, 2006, now U.S. Pat. No. 7,870,032, which in turn is a continuation of and claims priority from U.S. patent application Ser. No. 09/672,684, filed Sep. 28, 2000, now U.S. Pat. No. 7,110,973, which in turn claims the benefit of U.S. Provisional Application 60/156,814, filed Sep. 29, 1999; the contents of all of these earlier applications are incorporated by reference herein for all purposes.

FIELD OF THE INVENTION

The present invention relates generally to the field of electronic commerce. More particularly, the present invention relates to a method of and system for processing transactions, such as order entry and execution, and inquiries, such as order status and account information inquiries. The present invention provides increased availability to customers, increased reliability of execution, and increased auditability of the books and records of a firm.

DESCRIPTION OF THE PRIOR ART

Currently, a substantial amount of business is conducted using electronic commerce. There have been several phases in the development of electronic commerce. In each of these phases, more flexibility has been added to the way systems are constructed and the way systems perform has changed radically for both businesses and customers.

Prior to the development of the Internet, the typical structure of systems was to build a set of initially monolithic back-end servers, and then add new services in front of these to communicate with clients. A three-tier model of computing evolved, with an intermediate application server that addressed the problems of manageability and scalability as the number of clients grew. In practice, these systems were never as simple as the architectural diagrams made them out to be. They generated islands of computing, each with incompatible services and clusters of inaccessible data. This led to a spider's web of interconnected activity and ensured that little problems at one end of the network became large problems throughout the network. A new class of software was developed to integrate heterogeneous services.

True electronic commerce began with Web sites, brochures, and manual order entry. Initially, the Web was treated as just another client. There was a class of simple application Web servers that created its own data and used its own protocols. The simplest application to write were read-only brochure and e-mail order entry systems, which allowed more efficient distribution of information. They did not, however, have a significant impact on the customer experience and did not change consumer behavior. Competition among early adopters centered around who had the most seductive graphics and interactive content. These systems typically were flashy front-ends attached to unchanged back-end systems. Much of the real work was still done by people.

For many industries, the first generation model created little customer value. This was true for the stock brokerage industry. The first generation companies did not deliver real-time products electronically. The brokerage industry operates in a real-time world where prices change continuously and transaction completion requires integration with market data providers, trading venues, and settlement agencies. This mandates the integration of multiple inputs, processes and outputs.

In the second generation of electronic commerce, the entire customer interaction, from entering an order to delivering the end result, is done online. The customer becomes acutely aware of the underlying frailties of the assorted systems that perform the subprocesses of the order. The design of these systems reflects to customers the status of the respective processes.

Prior to the Internet, old-line financial institutions monopolized access to information. They turned the resulting customer ignorance about products and performance into profits. Access to information has allowed customers to disintermideate commissioned brokers as information distributors and take control of their financial lives. The Internet has empowered customers with more information and choices. The Internet economy has shifted the balance of power to customers.

Current electronic commerce systems have two salient characteristics. First, they are divided primarily along business and application ownership lines. The system and application boundaries are determined exclusively by the organization that owns the application or service. The second characteristic is that they are built with data control residing in physical control. Data belongs to a particular business and that business determines its location, which is forced accessing applications to choose between deployment on that same platform or inferior performance. The combination of these two factors has led to a tightly coupled, monolithic, centralized model with a classic two- or three-tiered client/server architecture.

Today, almost all corporate data is available from only one, very large system, and clients must submit requests to that system to both update and read data. The availability of the central system determines the availability of the entire system. The central system holds all the corporate data and the access to it. The present monolithic system is limited both in terms of availability and scalability. The availability of the central system determines the availability of the entire system. The central system holds all the corporate data and controls the access to it. The scalability of the total system is determined by the scalability of the central system.

Currently existing electronic commerce systems allow for continuously available, but not real-time, status of orders, or continuously available order entry without rapid electronic delivery from open markets. However, no current system maintains a continuously available, scalable order entry system for a business that has rapid electronic delivery from open markets together with real-time order status.

SUMMARY OF THE INVENTION

The present invention provides a method of and system for conducting electronic commerce. In the system of the present invention, an enterprise is segmented into a single firm side system, and multiple customer facing and street side systems. The firm side system maintains a single system of record for the enterprise. The firm side system settles orders, maintains customer account balances, and generally maintains the books and records of the enterprise. The firm side system maintains authoritative storage for the books and records of the enterprise. The firm side system has read-only access to data records replicated from the customer facing and street side systems. The system replicates data from the authoritative data storage of the firm side system to read-only storage associated with the customer facing systems and the street side systems.

The customer facing systems provide an interface between the enterprise and the customer for order entry, order status, and account and market information. Each customer facing system has associated therewith authoritative data storage and read-only data storage. The customer facing system writes to its associated authoritative data storage. The system replicates data records written to the authoritative data storage of any one of the customer facing systems to the authoritative data storage of each of the other customer facing systems. The system also replicates data records written the authoritative data storage of any one of the customer facing systems to the read-only data storage of the firm side system.

The street side systems are in communication with the customer facing systems. The street side systems provide an interface between the enterprise and various markets. Each street side system has associated therewith authoritative data storage that is written to by the street side system and read-only data storage. The system replicates data records written to the authoritative data storage of any one of the street side systems to the authoritative data storage of each of the other street side systems and to the read-only data storage of each of the customer facing systems and firm side system.

The system of the present invention writes and replicates data records to the authoritative data storage of the customer facing systems and the street side systems using an insert only/insert always strategy, without regard referential integrity and data normalization. Each data record is written or replicated as separate line in the data storage. The inquiry application in the customer facing system aggregates the data records to determine the true state of a transaction.

DESCRIPTION OF THE PREFERRED EMBODIMENT

Figure 1:
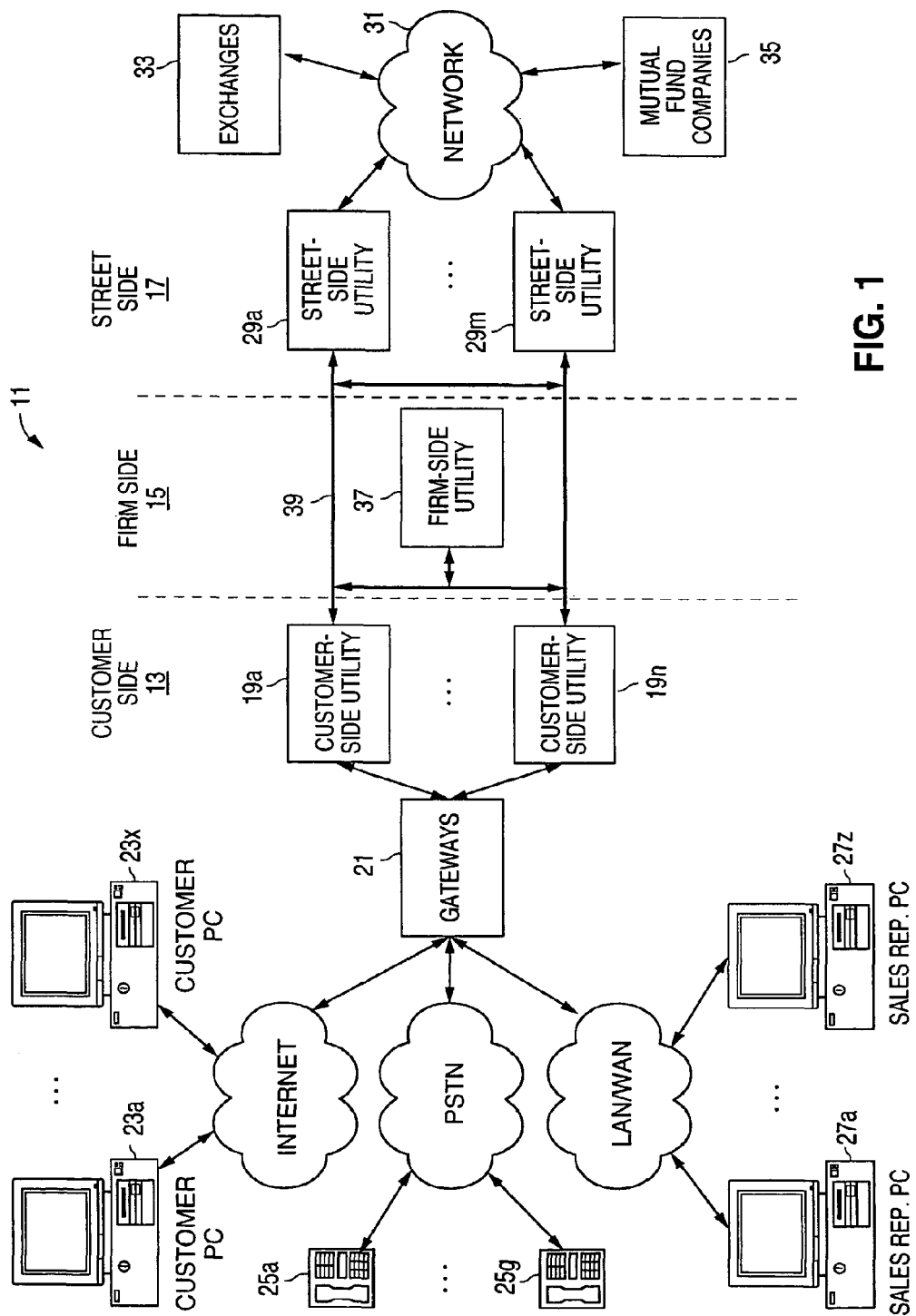
FIG. 1 is a block diagram of a system according to the present invention.

Referring now to the drawings, and first to FIG. 1, a system according to the present invention is designated generally by the numeral 11. According to the present invention, an enterprise is segmented into a customer facing side 13, a firm side 15, and a street side 17. The system of the present invention finds application to a retail brokerage enterprise.

Customer side 13 is implemented in a plurality of customer side utilities 19. Each customer side utility 19 includes applications for interacting with customers or customers' agents. The applications of the customer side utility 19 include order entry applications and query applications for providing information such as order status, balances, positions, market data, and the like. Customer side utilities 19 are adapted to respond to asynchronous requests from customers received through gateways indicated generally at 21.

Customers can communicate with customer side utilities 19 using customer PC's connected to the Internet using standard Web browser-enabled applications. Customers may also communicate asynchronous requests to customer side utilities 19 through the public switch telephone network using telephones 25. Gateways 21 may communicate with telephones 25 through voice response units or DTMF-enabled applications. Additionally, customers may communicate with customer side utilities 19 through intermediary retail sales representatives or brokers using personal computers 27 running Web based applications, terminal emulator programs, or the like.

The street side of the system of the present invention is implemented in a plurality of street side utilities 29. In the retail brokerage example of the present invention, street side utilities 29 provide all functionality necessary for executing customer orders. Thus, each street side utility 29 is adapted to communicate asynchronously and diversely through a network indicated generally at 31 with exchanges, indicated generally at 33, mutual fund companies, indicated generally at 35, and the like.

According to the present invention, the firm side of the enterprise is implemented in a firm side utility 37. Firm side utility 37 has access to the authoritative source of data comprising the books and records of the enterprise. Among other things, firm side utility 37 includes applications for settling orders, updating balances, and the like. Firm side utility 37 is adapted to perform end-of-day accounting, bulk processing, and it comprises the source of business intelligence for the enterprise. In the preferred embodiment, firm side utility 37 is implemented using a Geographically Distributed Parallel Sysplex (GDPS) infrastructure available from International Business Machines Corporation. The GDPS system provides failover redundancy to maintain the mission critical records of the firm.

Customer side utilities 19, firm side utility 15, and street side utilities 17 are interconnected for asynchronous communication with each other by a network indicated generally at 39. A customer request received at a gateway 21 is routed to a customer side utility. In the case of an order, the request is forwarded to a street side utility 29 for execution.

Figure 2:
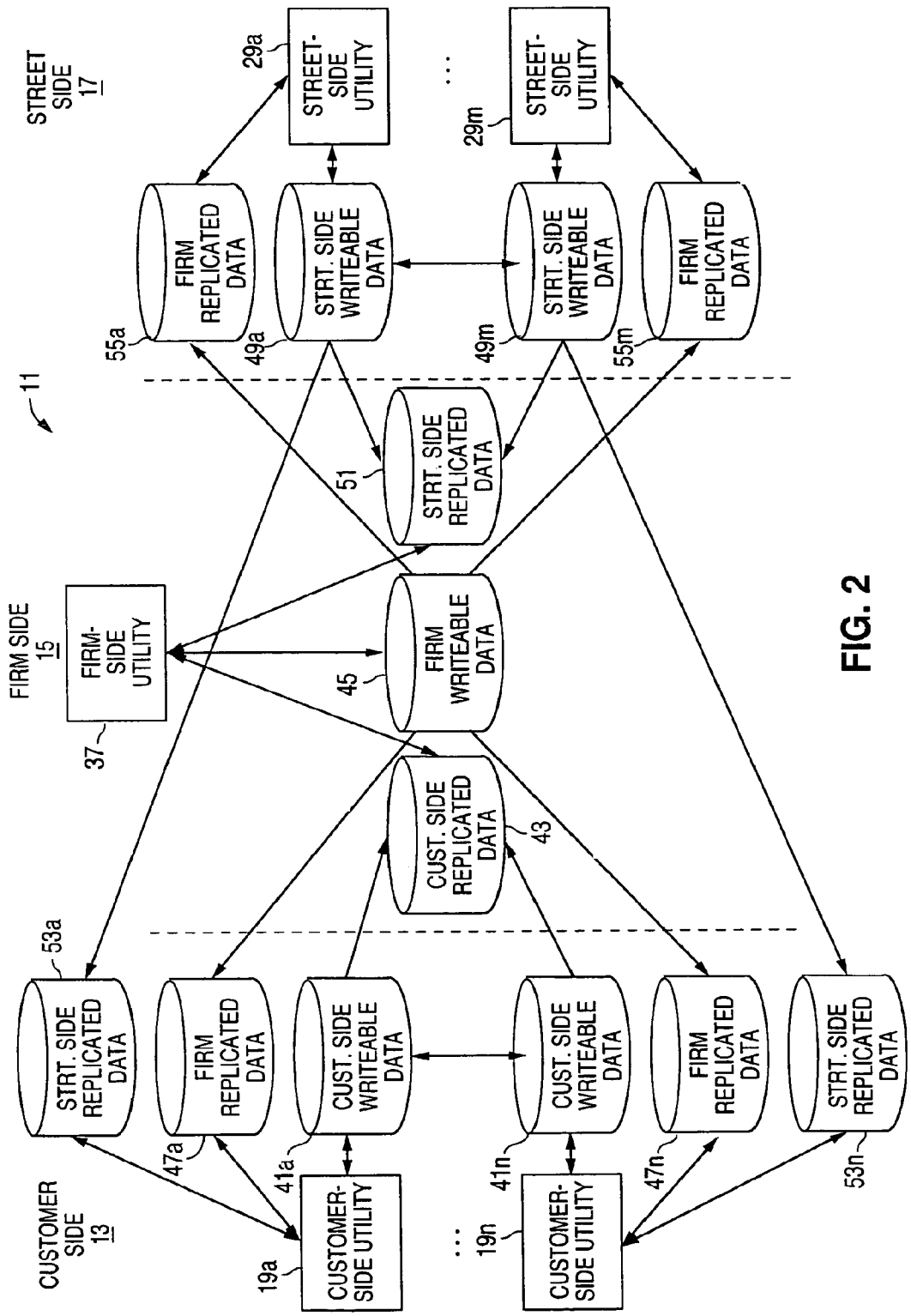
FIG. 2 is a diagram of data management and replication according to the present invention.

Referring now to FIG. 2, there is shown a block diagram of the data architecture system 11. Each customer side utility 19 has associated therewith customer side writable data storage 41. Customer side writable data 41 has a limited set of data that is updated only by a customer side utility 19. Customer side writable data is authoritative for customer side utilities 19.

According to the present invention, whenever a customer side utility 19 writes a data record to its associated customer side writable data 41, the system of the present invention replicates that data record to each of the other customer side writable data storage systems 41.

Data records written to customer side writable data 41 are also replicated to customer side replicated data 43, which is accessible by firm side utility 37. Firm side utility 37 uses customer side replicated data 43 in its work to settle orders, update balances, and the like. Firm side utility 37 uses customer side replicated data, and other data to settle orders, update balances, and the like. Firm side utility 37 writes the authoritative data of the firm to a single firm writable data storage 45. Firm writable data 45 is replicated to firm replicated data 47 associated with each customer side utility 19. Firm replicated data 47 is read-only by customer side utilities 19. Customer side utilities 19 access firm replicated data 47, together with customer side writable data 41 in order to respond to customer inquiries.

Each street side utility 29 has associated therewith street side writable data storage 49. Street side writable data 49 is written to by street side utilities 29 and it comprises the authoritative data for street side utilities 29. Whenever a data record is written to street side writable data 49, that data record is replicated to each street side writable data 49. Additionally, data records written to street side writable data 49 are replicated to street side replicated data 51 associated with firm side utility 37 and street side replicated data 53 associated with customer side utilities 19. Basic street side data associated with order status and execution is made available immediately through replication to customer side utilities 19. Additionally, firm side writable data 45 is replicated to firm replicated data 55 associated with street side utilities 29.

Figure 3:
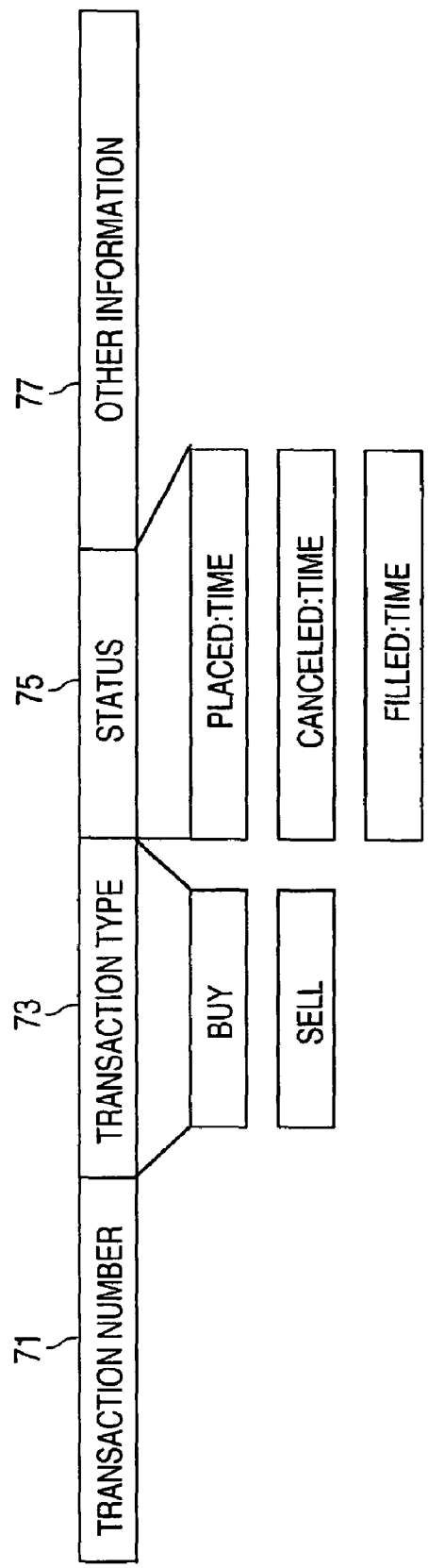
FIG. 3 is a pictorial view illustrating a transaction record format according to the present invention.

FIG. 3 illustrates the format of a transaction data record according to the present invention. Each transaction record includes a transaction identifier or number field 71. Each customer side utility 19 has a unique transaction numbering set or scheme so that the same transaction number is not assigned to more than one transaction. When a customer side utility 19 receives a transaction request from a customer, the receiving customer side utility assigns a transaction number to the transaction. All data records relating to the transaction are identified by the transaction number.

A transaction data record also includes a transaction type field 73, which identifies the type of transaction. In the retail securities environment, examples of transaction types include buy and sell orders. Those skilled in the art will recognize other transaction types, such as limit orders and the like. The status of the transaction is reflected in a status field 75. In the retail securities environment, for purchase and sale transactions, the status may be placed, canceled, and filled. Status field 75 includes a timestamp, which indicates the time at which the order was placed, canceled, or filled. The timestamp information is used to resolve conflicts. For example an order may be nearly simultaneously canceled and filled. The status change with the earlier timestamp will take precedence over the conflicting status change.

Other information concerning the transaction or status change is contained in an other information field 77. Examples of other information includes the number of shares, the company, and the transaction price.

According to the present invention, data records are written to customer side writable data 41 using an insert-only/insert-always strategy, as opposed to an update strategy, without regard to referential integrity or data normalization. More specifically, each data record is written as a separate row in a database rather than as an update.

The problem with an update strategy is that there must be a record to update. For example, when an order is placed, an order record is created. Whenever the order's state changes, the order record gets updated. However, in a distributed environment, with asynchronous linkages among systems, state changes may not occur in the anticipated order. An update event may occur or be received at a system without a record to change. The customer may gain access to the system through any of the customer side utilities 19. Accordingly, the customer may not interact with the same customer side utility on each access. Since transactions are processed and data records are replicated at finite speed, there are certain latencies inherent in the system. Also, there may be periodic failures or interruptions in links over which internal messages are transmitted or data is replicated. Thus, the data associated with a particular customer side utility 19 may not be complete or current.

Additionally, in current systems, a record that does not exist cannot be changed. Databases enforce constraints of this type through referential integrity. According to referential integrity, there is a relationship between two rows of a database that refer to each other. If the required relationship refers to something that does not exist, the database will not allow the update to occur. According to the present invention, each data record is inserted with regard to referential integrity.

Normalization aims at eliminating duplication of data. Instead of keeping the same data in multiple locations, in current systems the data is defined in one place, then it is referred to from any other place that is related to it. If the system of the present invention used normalized data in the replicated systems, then updates to an order would refer to the original order rather than duplicate that information. Because updates can arrive at different rates, the possibility exists that the original order information may not be there to refer to. Therefore instead of normalizing data, the system of the present invention duplicates information so that each data record carries with it essential information about the order. Thus, the customer side utility 19 can display the order information that it has no matter in which order the data records relating to the order arrive.

According to the present invention, the inquiry applications of customer side utilities 19 contain logic for aggregating the data records with respect to a single transaction to determine the true or best estimate of the state of the transaction. For example, if the data storage associated with a particular customer side utility contains a data record indicating that an order has been filled, but no data record indicating that the order has been placed, the customer side utility will report that the order has been filled. Similarly, if the data storage contains records indicating that an order has been both filled and canceled, the customer side utility will report that the order has been filled or canceled based upon which event occurred earlier.

It may be seen that the system of the present invention provides improved availability and ensures scalability while retaining flexibility. Because the system of the present invention uses smaller components, and asynchronous links to couple them, the system of the present invention is split into simpler parts that will each be more reliable. In addition, the customer side utilities 19 are continuously available by replication and load balancing among them. Customer side utilities 29 communicate with other parties by diverse routing so that a failure of one system does not stop the flow requests and responses.

Customer side utilities 19 and street side utilities 29 are independently scalable. Because customer side utilities 19 are replicated for availability, they may be scaled by further replicating more systems. The load on the firm side utility 37 is reduced because the inquiry load from customers and the communication with other parties is removed. Therefore, the size of the firm side utility system 37 can be reduced to a sustainable point on the technology curve. The street side systems 29 can be scaled independently and replicated just like the customer side utility systems 19.

From the foregoing, it may be seen that the present invention provides a continuously available, scalable order entry system for a business that has rapid electronic delivery from open markets together with real-time order status. The customer-facing and street-facing parts of the enterprise may be scaled independently to meet increasing volumes of transactions and inquiries. Order state data are replicated across the system so that real-time information is available to the customers.

The present invention has been illustrated and described with respect to presently preferred embodiments. Those skilled in the art will recognize alternative embodiments, given the benefit to the foregoing disclosure. Accordingly, the foregoing disclosure is intended for purposes of illustration rather than limitation.

What is claimed is:

1. An electronic commerce system, which comprises:

a plurality of customer facing utility systems, each of said customer facing utility systems coupled to a customer facing communication network, wherein the plurality of customer facing utility systems are each configured to communicate with customer systems coupled to the customer facing communication network, and each of said customer facing utility systems having associated therewith authoritative data that is writable to by said customer facing utility system and read-only data;

means for replicating data written to said authoritative data of any one of said customer facing utility systems to the authoritative data of each of the other customer facing utility systems;

a plurality of street side systems, each of said street side systems being adapted to communicate with street systems, each of said street side systems having associated therewith authoritative data that is writable to by said street side system and read-only data; and means for replicating data written to said authoritative data of any one of said street side systems to the authoritative data of each of the other street side systems.

2. The system as claimed in claim 1, including:
a firm side system, said firm side system having associated therewith authoritative data that is writable to by said firm side system and read-only data; and
means for replicating data written to said authoritative data of said firm side system to the read-only data of each of said customer facing utility systems.

3. The system as claimed in claim 2, including:
means for replicating data written to said authoritative data of any one of said customer facing utility systems to the read-only data of the firm side system.

4. The system as claimed in claim 1, including:
a firm side system, said firm side system having associated therewith authoritative data that is writable to by said firm side system and read-only data; and
means for replicating data written to said authoritative data of said firm side system to the read-only data of each of said street side systems.

5. The system as claimed in claim 4, including:
means for replicating data written to said authoritative data of any one of said street side systems to the read-only data of said firm side system.

6. The system as claimed in claim 4, including:
means for replicating data written to said authoritative data of any one of said street side systems to the read-only data of each of said customer facing utility systems.

7. An electronic commerce system, which comprises:
a plurality of customer facing utility systems, each of said customer facing utility systems being adapted to communicate with customer systems, each of said customer facing utility systems including means for processing customer orders received from customer systems and means for processing customer inquiries received from customer systems, and each of said customer facing utility systems having associated therewith authoritative data that is writable to by said customer facing utility system and read-only data;
means for replicating data records written to said authoritative data of any one of said customer facing utility systems to the authoritative data of each of the other customer facing utility systems;
a firm side system, said firm side system having associated therewith authoritative data that is writable to by said firm side system and read-only data;

means for replicating data written to said authoritative data of said firm side systems to the read-only data of each of said customer facing utility systems; and
means for replicating data records written to said authoritative data of any one of said customer facing utility systems to the read-only data of said firm side system.

8. The system as claimed in claim 7, including:
a plurality of street side systems, each of said street side systems being adapted to communicate with street systems, each of said street side systems including means for executing orders communicated from a customer facing utility system, and each of said street side systems having associated therewith authoritative data that is writable to by said street side system and read-only data; and
means for replicating data records written to said authoritative data of any one of said street side systems to the authoritative data of each of the other street side systems.

9. The system as claimed in claim 8, including:
a firm side system, said firm side system having associated therewith authoritative data that is writable to by said firm side system and read-only data; and
means for replicating data written to said authoritative data of said firm side systems to the read-only data of each of said street side systems.

10. The system as claimed in claim 9, including:
means for replicating data records written to said authoritative data of any one of said street side systems to the read-only data of said firm side system.

11. The system as claimed in claim 9, including:
means for replicating data records written to said authoritative data of any one of said street side systems to the read-only data of each of said customer facing utility systems.

12. The system as claimed in claim 11, wherein said means for processing customer orders includes:
means for creating a transaction record for said order; and
means for writing said transaction record to the authoritative data associated with said customer facing utility system.

13. The system as claimed in claim 11, wherein said means for responding to customer inquiries includes:
means for aggregating transaction records in said authoritative data to determine status of a transaction.

14. An electronic commerce system, which comprises:
a plurality of customer facing utility systems, each of said customer facing utility systems being adapted to communicate with customer systems, each of said customer facing utility systems including means for processing customer orders received from customer systems and means for processing customer inquiries received from customer systems, and each of said customer facing utility systems having associated therewith authoritative data that is writable to by said customer facing utility system and read-only data;
a plurality of street side systems, each of said street side systems being adapted to communicate with street systems, each of said street side systems including means for executing orders communicated from a customer facing utility system, and each of said street side systems having associated therewith authoritative data that is writable to by said street side system and read-only data;
means for replicating data records written to said authoritative data of any one of said street side systems to the authoritative data of each of the other street side systems; and means for replicating data records written to said authoritative data of any one of said customer facing utility systems to the authoritative data of each of the other customer facing utility systems.

15. The system as claimed in claim 14, including:
a firm side system, said firm side system having associated therewith authoritative data that is writable to by said firm side system and read-only data;
means for replicating data written to said authoritative data of said firm side system to the read-only data of at least one of said customer facing utility systems and said street side systems;
means for replicating data records written to said authoritative data of said customer facing utility systems to said read-only data of said firm side system; and
means for replicating data records written to said authoritative data of said street side systems to said read-only data of said firm side system.

16. The system as claimed in claim 14, wherein said means for processing customer orders includes:
means for creating a transaction record for said order; and
means for writing said transaction record to the authoritative data associated with said customer facing utility system.

17. The system as claimed in claim 14, wherein said means for responding to customer inquires includes:
means for aggregating transaction records in said authoritative data associated with said customer facing utility system to determine status of a transaction.

18. A method of processing customer transactions, which comprises the steps of:
receiving a customer transaction request at one customer facing utility system of a plurality of customer facing utility systems;
creating a record of said transaction request;
writing said transaction request record to data storage associated with said one customer facing utility system;
replicating said transaction request record to data storage associated with each of the other customer facing utility systems of said plurality of customer facing utility systems:
sending said transaction request from said one customer facing utility system to one of a plurality of street side systems;
executing said transaction request at said one street side system;
creating a record of said transaction execution;
writing said transaction execution record to data storage associated with said one street side system; and
replicating said transaction execution record to data storage associated with each of said customer facing utility systems.

19. The method as claimed in claim 18, wherein said transaction request is a buy order.

20. The method as claimed in claim 18, wherein said transaction request is a sell order.

21. The method as claimed in claim 18, wherein said transaction request is a cancel order.

22. The method as claimed in claim 18, wherein said transaction execution includes the step of filling an order.

23. The method as claimed in claim 18, including the steps of:
receiving a customer transaction inquiry at one of said customer facing utility systems; and
determining status of a transaction based upon transaction records in the data storage associated with said one customer facing utility system.

* * * * *